(No Model.)
R. M. BEATTY.
BICYCLE BELL.
No. 581,841.   Patented May 4, 1897.
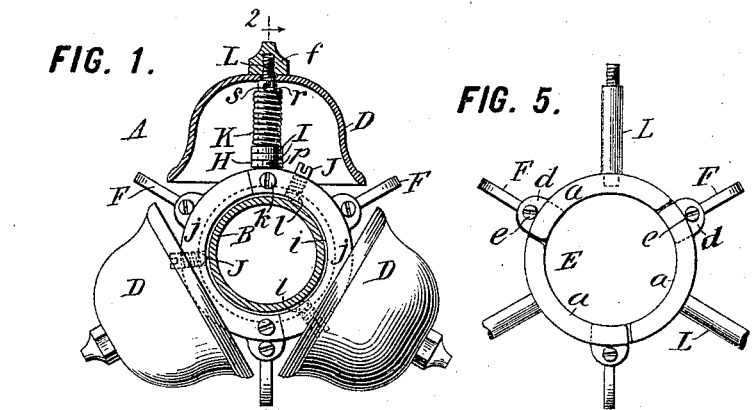
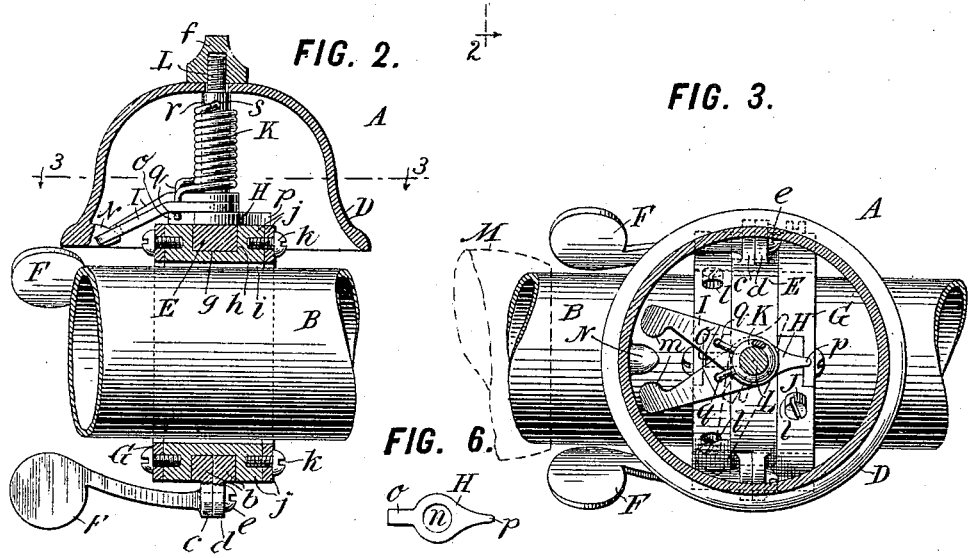
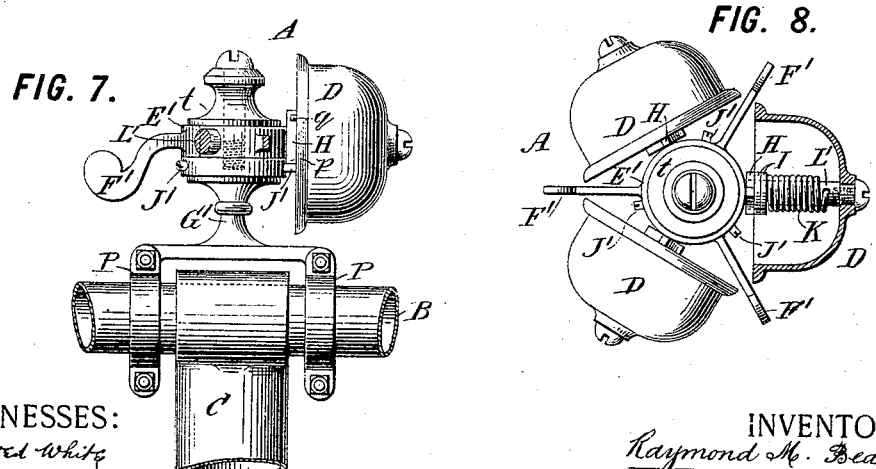
WITNESSES:
Fred White
Thomas F. Wallace
INVENTOR:
Raymond M. Beatty,
By his Attorneys,

UNITED STATES PATENT OFFICE.

RAYMOND M. BEATTY, OF NEWARK, NEW JERSEY.

BICYCLE-BELL.

SPECIFICATION forming part of Letters Patent No. 581,841, dated May 4, 1897.

Application filed April 25, 1896. Serial No. 589,022. (No model.)

*To all whom it may concern:*

Be it known that I, RAYMOND M. BEATTY, a citizen of the United States, residing in Newark, in the county of Essex and State of New Jersey, have invented certain new and useful Improvements in Bicycle and other Bells and the Like, of which the following is a specification.

This invention relates to bells and the like, and provides certain improvements in such devices especially applicable to alarm-bells for bicycles and other vehicles and to bells for such uses which are carried on the handle-bar or other analogous part of the vehicle.

The invention aims to provide a bell of simple construction which can be conveniently secured to a handle-bar and readily operated by the hand without releasing the grasp on the usual handle, and which will be durable and free from liability to rattling or accidental ringing when subjected to the jars and jolts incident to the use of bicycles and other vehicles.

To this end in carrying out my present invention in its preferred form I provide one or more bells proper or gongs, a carrier therefor rotatively mounted, and a holder for the carrier adapted to encircle and be fastened to a bicycle handle-bar, and I provide for the rotation of the carrier with its bell or bells, one or more hammers for sounding the latter, and means automatically operating the hammers when the carrier is rotated in one or both directions, and I provide certain other features of improvement in the construction, arrangement, and operation of bells and the like, which will be hereinafter more fully set forth.

Referring to the accompanying drawings, which illustrate certain adaptations of my invention suitable for bicycle and analogous uses, Figure 1 is a side elevation, partly in vertical section, showing the preferred form of my invention adapted for use on the handle-bar of a bicycle, the bar being shown in cross-section. Fig. 2 is an enlarged vertical section thereof, cut on the line 2 2 in Fig. 1, looking in the direction of the arrow and showing a fragment of the handle-bar in side elevation. Fig. 3 is a horizontal section cut on the line 3 3 in Fig. 2. Fig. 4 is a side elevation of the holder alone, on the same scale as Fig. 1. Fig. 5 is a fragmentary side elevation of the carrier alone, on the same scale as Fig. 1. Fig. 6 is plan view of the hammer-operator alone, on the same scale as Figs. 2 and 3. Fig. 7 is an elevation, partly broken away, showing a modification adapted for attachment to the handle-bar at the head of the steering-bar, the bars being shown fragmentarily in elevation; and Fig. 8 is a plan view thereof, partly in section.

Referring to the drawings, let A represent the alarm-bell as a whole, B the handle-bar of a bicycle, and C the steering-post of the latter.

I will now describe the preferred form of my invention, referring to Figs. 1 to 6, inclusive, of the drawings, in which D D are the gongs. E is the carrier therefor. F F are the bell-handles. G is the holder. H is the hammer-operator. I are the hammers. J are the operating projections. K is the hammer-spring, and L are the bell-posts.

The bells proper or gongs D preferably rotate or oscillate about the axis of the handle, being best mounted radially of this axis and preferably being three in number disposed in a circle at distances of one hundred and twenty degrees and having the usual or any suitable bell shape with their hollow or open sides toward the center. The carrier E may be any suitable member for carrying the bells D, and the holder G may be any desired part sufficing to suitably connect the carrier to and sustain it from the handle-bar or other part by which it is to be carried. The carrier shown consists of a ring formed of a plurality of segments *a*, having overlapping ends *b*, formed with ears *c d*, united by screws, rivets, or other suitable provisions *e*. The carrier has a post or other suitable portion L for carrying each bell D, one post for each segment *a* being shown, to which post the bell is attached by a nut *f*, engaging the screw-threaded end of the post and clamping the bell against a shoulder on the latter. The carrier is preferably rotary on the holder G, this being best provided for by constructing the holder with a substantially cylindrical bearing *g*, on which the inner face of the carrier fits, and with holding-walls *h* at the sides of this bearing, between which the sides of the carrier are held. The holder G is preferably constructed as a ring having a central aperture $i$ of sufficient size to pass over the handle-bar or other part to which it is to be applied, and suitable means for attaching it to such part are employed. The holder is shown as formed of two halves $j$, fitting together at their ends and united by screws $k$, so that the holder can be divided in order to place it around an object to which it is to be applied, if desired. The holder is shown as fixed to the handle-bar by the screws J, which screw into holes $l$ through the holder and embrace the bar at a plurality of points, so that their inner ends serve to fix the holder, while their outer ends serve as projections for the operator H. Preferably the holes $l$ are formed at a plurality of points in the holder, one series corresponding in number and in position to the number and position of the bells, so that when the screws are in this series of holes all the bells can be rung simultaneously, and another series of such number and position relatively to the bell, so that when the screws are in this series the bells can be rung in succession or irregularly, as desired. In the construction shown the screws J are shown at the right-hand side of the holder in position for ringing all the bells simultaneously, three equidistant holes being provided at this side for this purpose, while four equidistant holes are provided on the left-hand side by placing the screws for which the bells will be rung successively instead of simultaneously.

In the construction shown the bells and carrier are rotated by the thumb or finger of the user through the medium of handle F, which projects from the carrier between the bells, being preferably formed integrally with the adjacent ear $c$ of each segment $a$ and projecting toward the handle, (shown in dotted lines in Fig. 3 and lettered M,) so that the user while grasping the handle can extend one thumb or finger sufficiently to press against one of the handles F and drive the carrier and bells around either completely or partially, as desired. Any other suitable provision for turning the bells can be used. As shown, each segment $a$ and handle F is alike, each being formed of a single casting, into which the posts L are fitted.

The bells are each preferably constructed with a striking face or portion N, which preferably is an inwardly-projecting integral lug near the mouth of the bell. Two hammers are shown as provided for each bell, one being employed to strike when the bells are rotated in one direction and the other when they are oppositely rotated. These hammers are best pivoted on the posts L one above the other by being passed over the posts and have outward striking ends $m$, normally separated and standing the one at one side and the other at the other side of the lug N. The spring K holds the hammers in their inactive position and forcibly returns either toward this position when it is moved away therefrom, permitting it on its return to move far enough to strike the lug of the bell before its momentum is overcome, thereupon returning it to and holding it at the inactive position until again operated. The operator H is preferably a passive lever or dog having a central hole $n$ passing over the post L, a finger $o$, passing toward and between the hammers and engaging a projection on the latter to operate either, and having at its other end a tail $p$ in the path of the screws J and displaced by the latter to one side or the other as the carrier is rotated or oscillated in one direction or the other. The head $o$ preferably engages downturned points $q$ at the ends of the spring K, which points stick through holes in the hammers for operating the latter and below the hammers serve as shoulders for engagement with the finger $o$. When the finger is tilted in one direction, it moves from its inactive middle position into contact with one of the points $q$ and then tilts the hammer away from the lug N until the tail $p$ passes the screw J, when the operator returns to the mid-position, and the hammer is thrown toward the lug by the spring, as indicated in dotted lines in Fig. 3. Whichever hammer is operated operates independently of the other, which remains at its inactive position. Preferably a single spring is used to operate the double hammers, it being made, essentially, two springs by having its middle portion $r$ fixedly held in a hole $s$ in the post, while its opposite ends are coiled around the post and passed, respectively, the one into engagement with one hammer and the other into engagement with the other. Two hammers, one operator, and one spring are preferably employed for each bell.

In use the bell will be applied to the bar B by assembling the holder and fixing it to the latter, then assembling and uniting the carrier on the holder and applying the operator, hammers, and bells to the carrier, or the bells and their operating mechanism can be originally applied to the carrier-segments and the latter connected together as mounted on the holder. To regulate the character of striking, the screws J will be adjusted from one hole or holes to another hole or holes, as required. Access to the operating mechanism for any bell can be had by removing the gong by freeing the nut $f$. The operator will rotate the carrier and bells or will oscillate them, as desired, by means of the most convenient one of the handles F, or, if his hand is free, by striking the bells themselves to move them around.

It will be seen that my invention provides improvements which can be readily and advantageously availed of, and it will be understood that the invention is not limited to the particular details of construction, arrangement, combination, and use set forth as constituting the preferred form of the invention, but that it can be employed in whole or in part according to such modifications as circumstances or the judgment of those skilled in the art may dictate without departing from the spirit of the invention.

One modification is shown in Figs. 7 and 8, in which the bells, their hammers, hammer-spring, and operator are identical with those before described and bear the same letters of reference, while the carrier is an integral ring E', having handles F' and posts L', rotating on a vertical axis on a holding-post G', held thereon by a cap $t$, which post is clamped to the handle-bars B by two clamps P at opposite sides of the steering-post C. In this construction the operating projections J' are screwed into the post G'. The bell when thus mounted can be operated by either hand of the user.

What I claim is, in bicycle-bells and the like, the following-defined novel features and combinations, substantially as and for the purpose hereinbefore set forth, namely:

1. In bells for bicycle handle-bars and the like, two annular members passing around the bar, the one fixed thereto and the other rotative around the longitudinal axis thereof, strikers carried by one of said members, and projections carried by the other of said members, and operating the strikers during their relative movements, and a plurality of bells proper carried by one of said members opposite said strikers, surrounding and disposed with their axes at substantially right angles to the axis of said bar.

2. In bells for bicycle handle-bars and the like, two annular members passing around the bar, one fixed and the other rotative, a plurality of cup-shaped bells having their hollow sides toward and carried by one of said members, strikers for said bells on one of said members, and projections on the other of said members operating said strikers during rotative movement of the rotative member.

3. In bells, a bell, two oppositely-acting hammers therefor, a spring holding said hammers in inactive positions, and a projection moving one of said hammers independently of the other to strike the bell.

4. In bicycle-bells and the like, a bell and a rotary bell-carrier, the latter having a central aperture for passing over and rotating around the handle-bar of a bicycle, and means for rotating the bell and carrier around such bar.

5. In bells, a rotary bell D, a rotary carrier E therefor, handle F projecting substantially parallel with the axis of rotation of said carrier for rotating said bell and carrier, and a striker for striking the bell.

6. In bells for bicycle handle-bars and the like, a plurality of bells having their hollow sides adjacent, an annular rotative carrier passing around said bar and within and carrying said bells, and strikers within said bells.

7. In bells for bicycle handle-bars and the like, two annular members passing around the bar, one fixed and the other rotative, and one a bell-carrying member, a bell proper carried by the latter, a striker carried by one of said members, a series of projections surrounding and carried by the other of said members, and a movable operator pivoted to one of said members, engaging said projections and operating said striker during rotative movement of the rotative member.

8. In bells for bicycle handle-bars and the like, two annular members passing around the bar, one fixed and the other rotative, and one a bell-carrying member, a bell proper carried by the latter, a striker carried by one of said members, a series of projections surrounding and rigidly carried by the other of said members and operating said striker during rotative movement of the rotative member, and a handle connected to the latter for rotating it.

9. In bells for bicycle handle-bars and the like, a holder G and a carrier E surrounding the handle-bar and rotative the one relative to the other, a bell D carried by said carrier, a striker within said bell and attached to said carrier, a series of projections on said holder operating said striker during relative rotation between the holder and carrier, and a handle connected to the rotary part for rotating it.

In witness whereof I have hereunto signed my name in the presence of two subscribing witnesses.

RAYMOND M. BEATTY.

Witnesses:
GEORGE H. FRASER,
THOMAS F. WALLACE.